United States Patent
White et al.

(10) Patent No.: US 10,701,131 B2
(45) Date of Patent: *Jun. 30, 2020

(54) SYSTEM AND METHOD FOR CAPTURING INTERACTION DATA RELATING TO A HOST APPLICATION

(71) Applicant: Verint Americas Inc., Alpharetta, GA (US)

(72) Inventors: Alexei R. White, San Francisco, CA (US); Mitchell Cohen, Ann Arbor, MI (US); Michael Han, West Vancouver (CA); Ho Yan Leung, Vancouver (CA)

(73) Assignee: Verint Americas Inc., Alpharetta, GA (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/940,379

(22) Filed: Mar. 29, 2018

(65) Prior Publication Data

US 2018/0219936 A1     Aug. 2, 2018

Related U.S. Application Data

(63) Continuation of application No. 14/216,889, filed on Mar. 17, 2014, now Pat. No. 9,961,127.

(60) Provisional application No. 61/793,943, filed on Mar. 15, 2013.

(51) Int. Cl.
*H04L 29/08* (2006.01)
*H04M 1/725* (2006.01)

(52) U.S. Cl.
CPC .............. *H04L 67/04* (2013.01); *H04L 67/22* (2013.01); *H04M 1/72522* (2013.01); *H04M 2250/10* (2013.01); *H04M 2250/12* (2013.01)

(58) Field of Classification Search
USPC ........................................................ 709/203
See application file for complete search history.

(56) References Cited

U.S. PATENT DOCUMENTS

| | | | |
|---|---|---|---|
| 5,321,838 A * | 6/1994 | Hensley .............. | G06F 11/3466 714/38.1 |
| 5,333,302 A * | 7/1994 | Hensley .............. | G06F 11/3414 703/22 |
| 5,790,798 A * | 8/1998 | Beckett, II ............ | G06F 3/1462 345/428 |
| 5,793,948 A * | 8/1998 | Asahi .................... | G06F 11/323 714/45 |
| 6,189,047 B1 * | 2/2001 | Ball ....................... | G06F 9/542 719/318 |
| 6,532,023 B1 * | 3/2003 | Schumacher ....... | G06F 11/3414 714/E11.193 |
| 6,662,226 B1 * | 12/2003 | Wang .................... | G06Q 20/04 709/203 |
| 7,523,191 B1 | 4/2009 | Thomas et al. | |
| 7,653,721 B1 * | 1/2010 | Romanov .............. | G06F 9/451 709/224 |

(Continued)

*Primary Examiner* — Abdullahi E Salad
(74) *Attorney, Agent, or Firm* — Meunier Carlin & Curfman LLC

(57) ABSTRACT

Systems and methods for capturing interaction data relating to a host application (app) implemented on a mobile device are disclosed. A tracking module is embedded in the host application. Interaction data relating to the host application is captured on the mobile device with the tracking module. The captured interaction data is transmitted from the mobile device.

20 Claims, 5 Drawing Sheets

(56) References Cited

U.S. PATENT DOCUMENTS

| | | | |
|---|---|---|---|
| 7,870,504 B1* | 1/2011 | McIntosh | G06F 11/2273 715/803 |
| 7,904,596 B1* | 3/2011 | Wang | G06Q 20/04 382/182 |
| 7,941,525 B1 | 5/2011 | Yavilevich | |
| 8,122,122 B1* | 2/2012 | Clingenpeel | G06F 21/552 709/203 |
| 8,914,496 B1 | 12/2014 | Richardson et al. | |
| 9,065,827 B1 | 6/2015 | Taylor et al. | |
| 9,135,714 B1* | 9/2015 | Gauf | G06F 3/00 |
| 2004/0103409 A1* | 5/2004 | Hayner | G06F 11/3409 717/143 |
| 2004/0186882 A1 | 9/2004 | Ting | |
| 2005/0060719 A1* | 3/2005 | Gray | G06F 9/451 719/318 |
| 2005/0144150 A1* | 6/2005 | Ramamurthy | G06Q 10/06 706/45 |
| 2005/0183143 A1* | 8/2005 | Anderholm | G06F 11/32 726/22 |
| 2005/0278630 A1* | 12/2005 | Bracey | G06F 11/3438 715/704 |
| 2007/0083813 A1* | 4/2007 | Lui | G06F 11/3612 715/709 |
| 2007/0100994 A1* | 5/2007 | Armstrong | G06F 11/28 709/224 |
| 2007/0157249 A1 | 7/2007 | Cordray et al. | |
| 2008/0219658 A1* | 9/2008 | Keane | H04N 1/00244 396/429 |
| 2008/0256399 A1* | 10/2008 | Erdosi | G06F 11/366 714/47.1 |
| 2009/0249300 A1* | 10/2009 | Vainer | G06F 11/3466 717/127 |
| 2010/0095208 A1* | 4/2010 | White | G06F 11/3438 715/704 |
| 2010/0107175 A1* | 4/2010 | Abe | G06F 11/3404 718/107 |
| 2010/0123717 A1 | 5/2010 | Jiao et al. | |
| 2010/0153548 A1* | 6/2010 | Wang | G06Q 20/04 709/224 |
| 2010/0174992 A1* | 7/2010 | Portman | G06F 9/451 715/738 |
| 2010/0257456 A1* | 10/2010 | Lieb | G06Q 10/10 715/741 |
| 2010/0293511 A1* | 11/2010 | Agnetta | G09G 5/003 715/864 |
| 2010/0293566 A1 | 11/2010 | Valdez | |
| 2010/0325258 A1* | 12/2010 | Carpenter | G06F 11/3414 709/224 |
| 2011/0026828 A1* | 2/2011 | Balasubramanian | G06K 9/00449 382/187 |
| 2011/0179387 A1 | 7/2011 | Shaffer et al. | |
| 2011/0213822 A1* | 9/2011 | Yavilevich | G06Q 30/02 709/202 |
| 2011/0218841 A1* | 9/2011 | Deshmukh | G06Q 10/06393 705/7.39 |
| 2011/0239243 A1 | 9/2011 | Dierks et al. | |
| 2012/0041945 A1* | 2/2012 | Blubaugh | G06F 16/25 707/722 |
| 2012/0066378 A1* | 3/2012 | Lui | G06F 11/3612 709/224 |
| 2012/0079103 A1* | 3/2012 | Wang | G06Q 20/04 709/224 |
| 2012/0089996 A1 | 4/2012 | Ramer et al. | |
| 2012/0198390 A1* | 8/2012 | Bogusky | G06Q 10/06 715/854 |
| 2013/0014146 A1 | 1/2013 | Bhatia et al. | |
| 2013/0055072 A1* | 2/2013 | Arnold | G06T 15/005 715/240 |
| 2013/0110588 A1* | 5/2013 | Livne | G06Q 10/06 705/7.38 |
| 2013/0120401 A1* | 5/2013 | Borysenko | G06T 13/80 345/473 |
| 2013/0132833 A1 | 5/2013 | White et al. | |
| 2013/0173351 A1* | 7/2013 | Livne | G06Q 10/06398 705/7.38 |
| 2013/0275579 A1 | 10/2013 | Hernandez et al. | |
| 2013/0346599 A1 | 12/2013 | Wilson et al. | |
| 2014/0007114 A1 | 1/2014 | Wang et al. | |
| 2014/0068421 A1* | 3/2014 | Bourke | G06F 8/38 715/235 |
| 2014/0095702 A1 | 4/2014 | Kalus et al. | |
| 2014/0099069 A1* | 4/2014 | Balasubramanian | H04N 5/93 386/234 |
| 2014/0101640 A1* | 4/2014 | Romdhane | G06F 11/3684 717/125 |
| 2014/0122702 A1 | 5/2014 | Jung et al. | |
| 2014/0125822 A1* | 5/2014 | Mullins | C04N 1/00244 348/207.1 |
| 2014/0137246 A1 | 5/2014 | Baluda et al. | |
| 2014/0146958 A1* | 5/2014 | Geffen | H04M 3/5175 379/265.06 |
| 2014/0149506 A1 | 5/2014 | Yuan | |
| 2014/0173700 A1 | 6/2014 | Awan et al. | |
| 2014/0215344 A1* | 7/2014 | Ligman | H04L 67/22 715/736 |
| 2014/0237415 A1 | 8/2014 | Amerige | |
| 2014/0240337 A1 | 8/2014 | Lindholm | |
| 2017/0243145 A9* | 8/2017 | Reimer | G06Q 30/06 |
| 2017/0346864 A1* | 11/2017 | Nataros | H04L 65/602 |

* cited by examiner

SYSTEM AND METHOD FOR CAPTURING INTERACTION DATA RELATING TO A HOST APPLICATION

CROSS REFERENCE TO RELATED APPLICATION

This application is a continuation application of U.S. application Ser. No. 14/216,889 filed Mar. 17, 2014, which claims the benefit of U.S. Provisional Patent Application Ser. No. 61/793,943 filed Mar. 15, 2013.

BACKGROUND OF THE INVENTION

1. Field of the Invention

The present application relates generally to systems and methods for capturing interaction data on a mobile device. More specifically, the present application relates to systems and methods for capturing of interaction data relating to a host application implemented on the mobile device.

2. Description of Related Art

It is desirable for an entity to be able to observe and/or collect and analyze interaction data relating to the webpages of the entity. Commercial software for collecting and analyzing interaction data relating to webpages is known. One such example is disclosed in U.S. patent application Ser. No. 13/746,231, which was filed on Jan. 21, 2013, by the Applicants of the subject patent application, and which is expressly incorporated herein by reference in its entirety.

However, such known tools do not permit the collection or analysis of details of interaction data relating to a host application, known more commonly as an "app." Apps are software applications that are designed specifically for mobile devices, such as, but not limited to, smart phones and tablets. Both apps and websites are accessible on the mobile devices. However, unlike a webpage, an app operates in a completely free environment once embedded in the mobile device. As such, the app has access to nearly everything supported by the mobile device. Furthermore, unlike a webpage that must be rendered within a browser, an app must be downloaded and installed on the mobile device.

Known tools and methods for capturing interaction data relating to webpages cannot be utilized to capture interaction data relating to apps embedded on mobile devices. The reason is predominately a result of the fundamental differences between a webpage and an app.

Because of such limitations, it is desirable to provide systems and methods that provide capturing of interaction data relating to a host application (app) on a mobile device. It is also desirable to provide systems and methods that provide such capturing of interaction data without significant performance impact on the mobile device.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION OF THE INVENTION

Referring to the Figures, wherein like numerals indicate like or corresponding parts throughout the several views, a system for capturing and replaying interaction data relating to a host application implemented on a mobile device is generally shown at 10.

Figure 1:
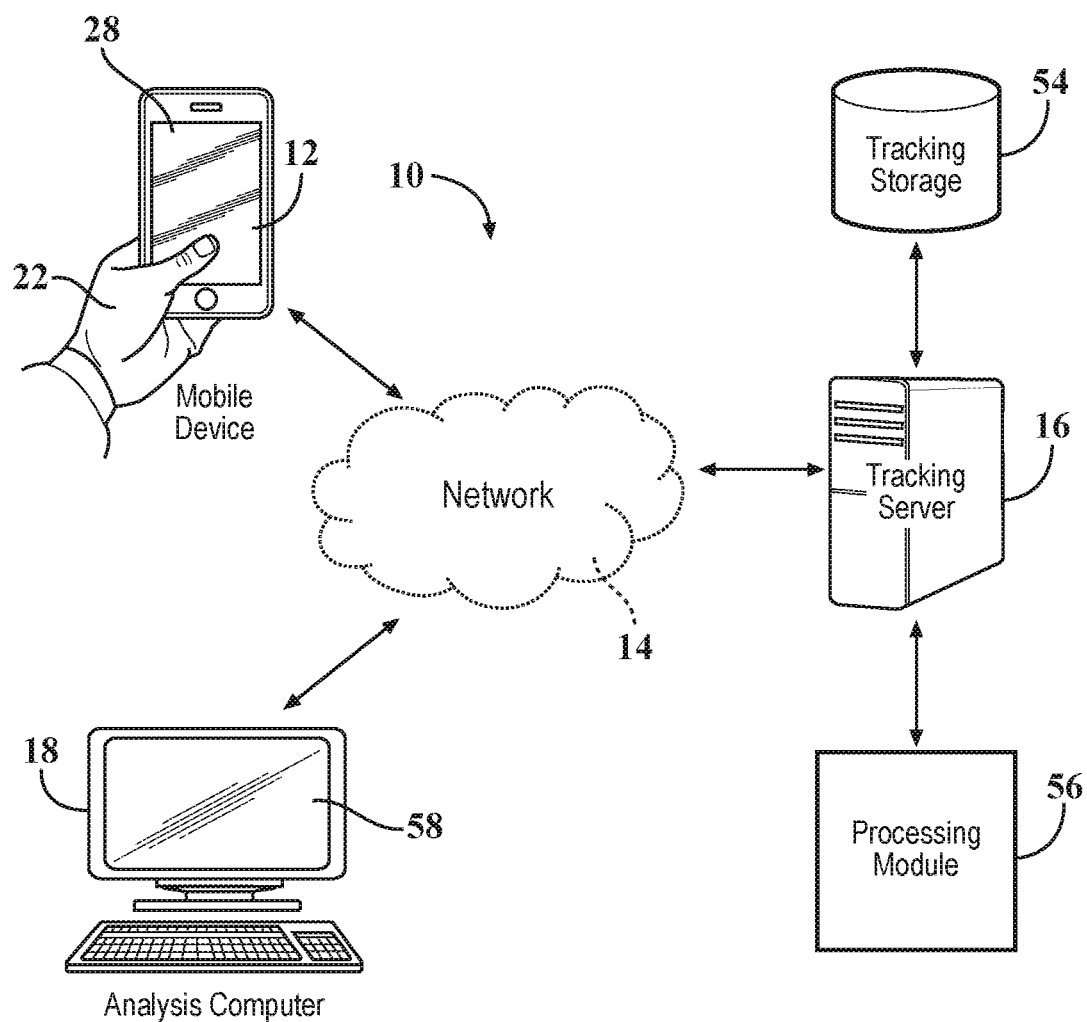
FIG. 1 is an architectural view of a system for capturing and replaying interaction data relating to a host application implemented on a mobile device, according to one embodiment of the present invention.

As illustrated in FIG. 1, the system 10 includes a mobile device 12. The mobile device 12 may include any suitable mobile device, such as, but not limited to a smart phone or a tablet. Examples of the mobile device 12 non-exclusively include the iPad® or iPhone® by Apple®, Inc.

Figure 2:
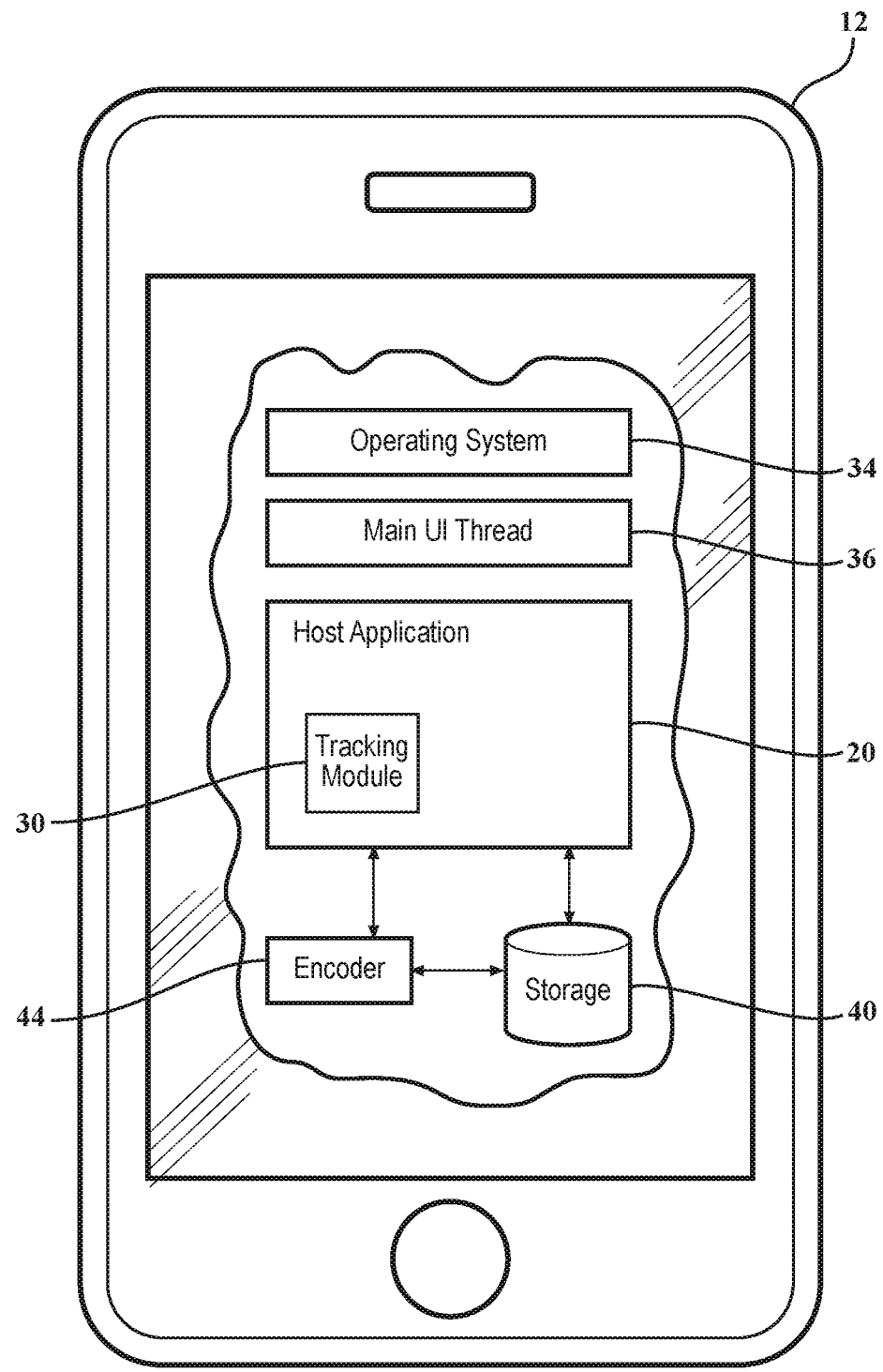
FIG. 2 is a computer architectural view of the mobile device of the system, according to one embodiment of the present invention.

The mobile device 12 is connected to a network 14. The network 14 may include, for example, a local area network (LAN), wide area network (WAN), world wide web (WWW), or the Internet. As shown in FIG. 2, the mobile device 12 includes an operating system 34, such as, but not limited to, iOS® by Apple® or Android® by Google®.

The system 10 includes a tracking server 16 that is connected to the network 14. The tracking server 16 is in communication with the mobile device 12 through the network 14. The system 10 further includes an analysis computer 18 that is connected to the network 14. The analysis computer 18 is in communication with the tracking server 16 through the network 14.

As illustrated in FIG. 2, a host application 20 is implemented on the mobile device 12. The host application 20 is commonly known in the art as an "app." The host application 20 is generally a self-contained program designed to fulfill a particular purpose. The host application 20 is distinguished from a mobile webpage or a browser-based extension. Unlike a mobile webpage or a browser-based extension, the host application 20 operates independently from a web browser and includes a separate and dedicated user interface (UI). The host application 20 is configured to operate in a completely free environment once embedded in the mobile device 12. As such, the host application 20 has full access to whatever the mobile device 12 supports. Also, unlike a web page, the host application 20 is downloaded and installed on the mobile device 12.

A user 22 generally operates and interacts with the mobile device 12, and thus by extension, has access to and interacts with the host application 20. The host application 20 may fulfill any suitable particular purpose. For example, the host application 20 may provide a game, a social networking medium, an interface to news or weather, and the like.

Figure 3:
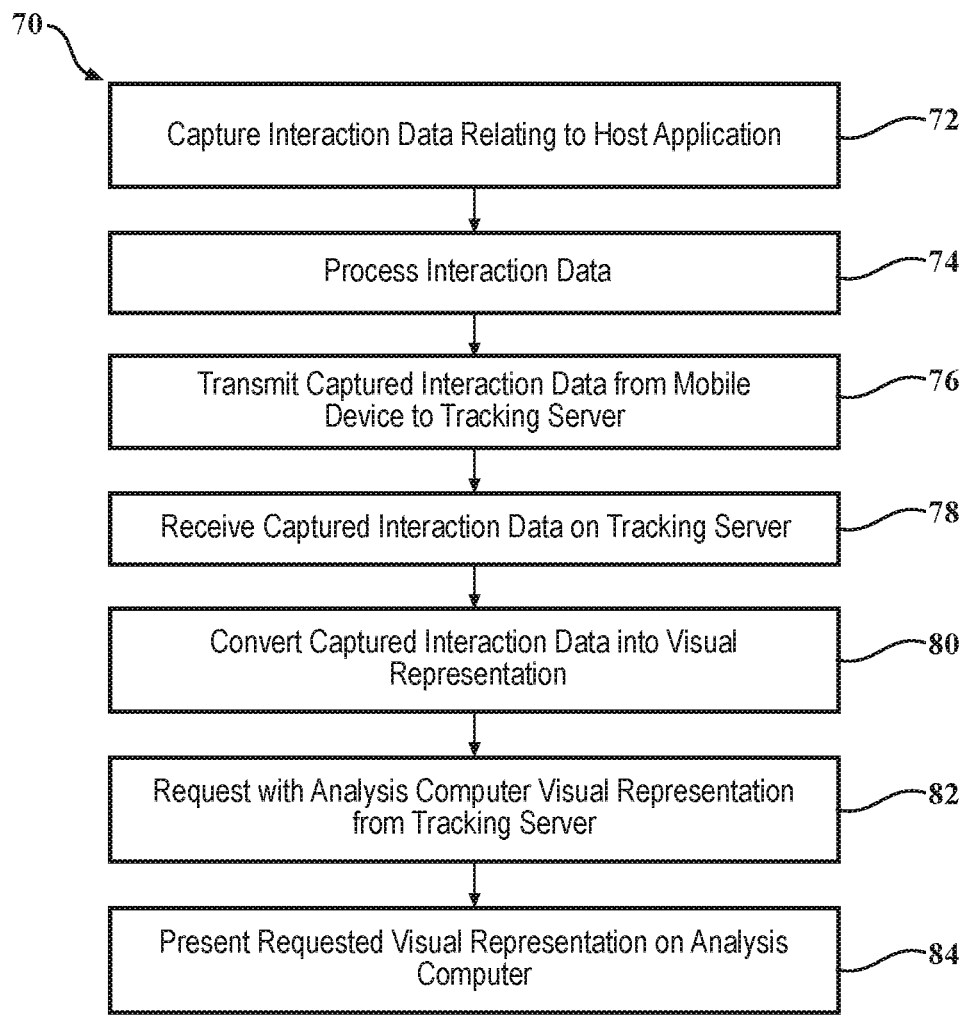
FIG. 3 is a flow chart illustrating a method for capturing and replaying interaction data relating to the host application implemented on the mobile device, according to one embodiment of the present invention.

A method for capturing and replaying interaction data relating to the host application 20 implemented on the mobile device 12 is generally shown at 70 in FIG. 3. At step 72, interaction data relating to the host application 20 is captured on the mobile device 12. The interaction data may be subsequently replayed on the analysis computer 18, as will be described below.

Interaction data may be initiated by the user 22. For example, the user 22 may interact with the host application 20 by actively interfacing with, e.g., pressing, a display 28 on the mobile device 12. Alternatively, interaction data may be initiated by the host application 20. For example, the host application 20 may refresh images on the display 28. This may be done so independent of any interaction from the user 22. As such, the term "interaction data" is not limited to data that is initiated by the user 22.

Interaction data may include visual interaction data, which is likewise captured on the mobile device 12. In one embodiment, screen display images of the host application 20 are provided on the display 28 on the mobile device 12. The visual interaction data may include "screen-shots" or "screen-captures" of such screen display images of the host application 20 at any given time. Screen display images may be captured in any suitable format, such as a Bitmap (BMP) format, or the like. As will be described in detail below, such screen display images may be encoded into a movie format, e.g., MPEG, AVI, WMV, MP4, or the differences from one screen display image to the next may be stored off in raw form for transmission later.

In one embodiment, capturing visual interaction data includes capturing a change to the image. In one instance, the change to the image may be initiated by the user 22. Alternatively, the change to the image may be initiated by the host application 20 such that the change is initiated independent of the user 22. In one embodiment, capturing the change to the image includes capturing a visual change to the image. Alternatively, capturing the change to the image includes capturing a non-visual change to the image.

In another embodiment, visual interaction data may include camera data. Camera data may include images or video captured by a camera on the mobile device 12. In one instance, such camera data may be utilized to capture facial expressions of the user during interaction with the host application 20.

Interaction data may also include non-visual interaction data. In such situations, non-visual interaction data is captured on the mobile device 12. In one embodiment, non-visual interaction data may include meta-data, which includes one, or a combination of, a touch-event, gesture data, GPS coordinate data, audio data, accelerometer data, and orientation data. A touch-event generally includes the user's 22 movements and selections, such as pointing-clicks and scrolling. Gesture data generally includes the user's 22 flicking, panning, minimizing, or stretching the images on the display 28. GPS coordinate data includes positional information corresponding to where the mobile device 12 is located at any give time. Audio data may include audio that was played to the user 22 during interactions with the mobile device 12. Orientation and/or accelerometer data generally include information representing how the mobile device 12 is being held. For example, such data may represent whether the mobile device 12 is held in a portrait or landscape format and/or at a pose with respect to a vertical and/or horizontal axis. In another embodiment, non-visual interaction data includes barometer data, which may be data relating to augmentation of GPS on the mobile device 12. Additionally, non-visual interaction data may include compass data, including navigational data for supplementing GPS on the mobile device 12. Furthermore, non-visual interaction data may include camera data, such as data relating to when the camera is forward-facing.

The non-visual interaction data of the user session may be captured as a sequence of events that are recorded into a buffer along with their time indexes. Each event contains information pertaining to when the event occurred (a timestamp) and what event occurred (an event type). Events can also contain an arbitrary payload of data. In one example, the format of the event, represented in JSON format, would be as follows:

```
{
    "timestamp": 1343936783,
    "type": "gesture type",
    "data": {
        ... //event-type-specific structure
    }
}
```

In one example, the "timestamp" property of the non-visual interaction data could be Unix time. The "type" and "data" properties of the non-visual interaction data may be used in processing at the tracking server 16. The "data" property of the non-visual interaction data may be a JSON data structure. Alternate formats of the "data" property include XML or serialized object model.

On the Android platform, for example, touch events can be captured by registering as a touch event listener on a root view, such as a top view in a view hierarchy. Some types of subviews, such as text boxes and list views, may not propagate touch events up the view hierarchy by default. In such situations, touch events can be captured by registering as a touch event listener directly on the view in question. According to one way of achieving this, the view hierarchy is "walked" from the root view down to search for views that require this approach.

Touches may be recorded in groups as part of a larger gesture event. Each touch in a gesture may be uniquely identified to associate a given touch at some time with the finger it belongs to as part of that gesture. Device orientation and layout (interface) orientation can also be recorded in the event stream.

In one embodiment, capturing interaction data includes capturing only visual interaction data. In another embodiment, capturing interaction data includes capturing only non-visual interaction data. In yet another embodiment, capturing interaction data includes capturing both visual interaction data and non-visual interaction data.

Visual interaction data may be captured at a different time than non-visual interaction data. Alternatively, visual interaction data and non-visual interaction data may be captured simultaneously. In one example, an image may be captured and simultaneously encoded with a time-stamp including a sequence of characters or encoded information identifying when the image is captured.

As shown in FIG. 2, a tracking module 30 is provided. In one embodiment, the tracking module 30 is embedded in the host application 20. When the tracking module 30 is embedded in the host application 20, it is not a stand-alone software application by itself.

The tracking module 30 is configured to capture interaction data. In other words, the tracking module 30 is configured to capture visual interaction data and/or non-visual interaction data. The tracking module 30 is also configured to capture times associated with the visual interaction data and/or non-visual interaction data.

In one embodiment, the tracking module 30 is further defined as an application programming interface (API). The API is configured to access databases and hardware of the mobile device 12. The API is source-code based and specifies a set of functions or routines that interact with the host application 20 for capturing of interaction data. The API may include a library that includes specifications for suitable routines, data structures, object classes, and variables. The tracking module 30 may have other configurations without departing from the scope of the invention.

The tracking module 30 may employ several different techniques for capturing non-visual interaction data. On iOS, for example, the tracking module 30 can use the provided CoreMotion framework to receive processed device motion events and log the roll, pitch, yaw (the Euler angles) of the device. For efficiency, the tracking module 30 can throttle event delivery to two events per second or any arbitrary frequency. For layout orientation on iOS, certain system notifications are notified when the host application's 20 interface has changed orientation. One example of such system notification is UIApplicationDidChangeStatusBarOrientationNotification. The tracking module 30 may record the presence of such system notifications. Other device events, such as orientation change, may be captured utilizing standard Android or iOS sensor APIs.

The tracking module 30 may capture visual and/or non-visual interaction data at predetermined time intervals. With visual interaction data, the tracking module 30 may capture images from the mobile device 12 according to any suitable pixel format. In one version, an object reference to the top view in the view hierarchy (or the root view) is obtained and is written to a bitmap. The bitmap is written asynchronously to storage on the mobile device 12 for later processing.

In one technique for capturing visual interaction data with the tracking module 30, a reference to all of the host application's 20 UI Window objects is acquired. The UI Window objects include backing layers that are rendered in order from back to front to a graphics context, such as CGContextRef. The backing layers then create a UI Image object from the graphics context. The rendering operation traverses the layer tree and renders all sublayers. In one embodiment, the coordinate system's origin is oriented to the bottom-left. Alternatively, the coordinate system's origin may be oriented to the top-left. A simple transform and/or scaling may be required before drawing the layer to the graphics context.

Figure 4:
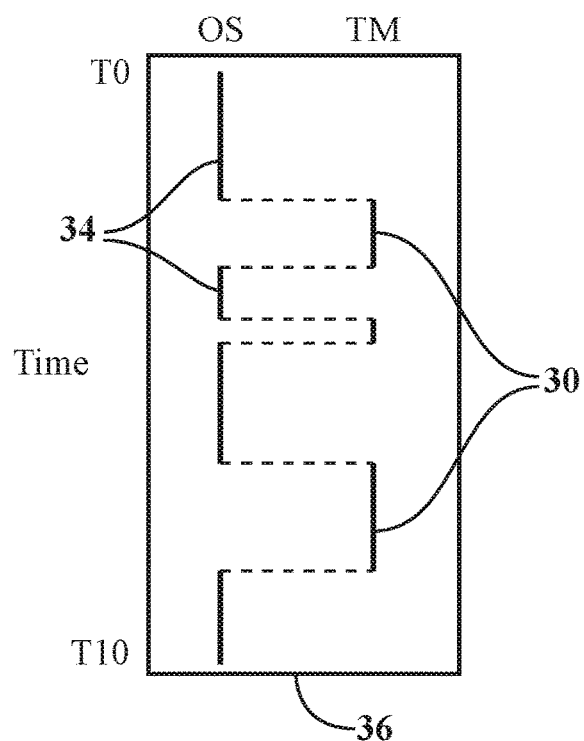
FIG. 4 is a computer process view of a method of capturing visual interaction data, according to one embodiment of the present invention.
Figure 5:
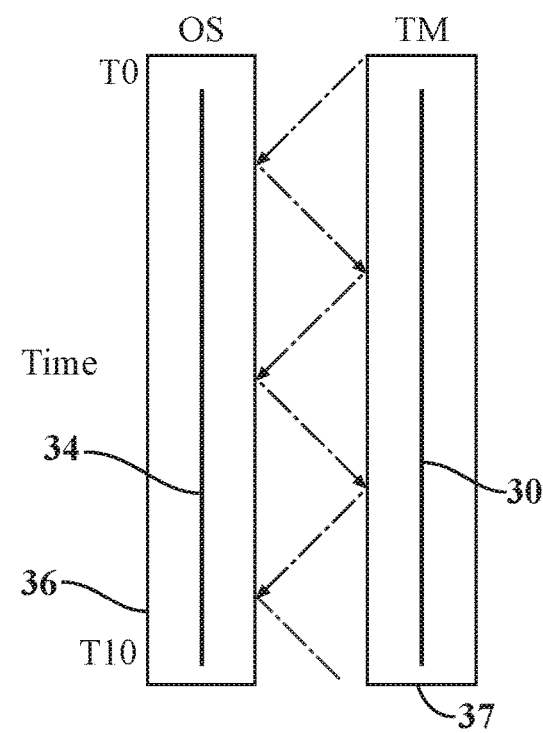
FIG. 5 is a computer process view of a method of capturing visual interaction data, according to another embodiment of the present invention.

As shown in FIGS. 2, 4, and 5, the mobile device 12 generally includes a main user interface (UI) thread 36, which provides main execution paths for handling user input to the mobile device 12 and responding to user events on the mobile device 12. The main UI thread 36 is the main thread of execution for the host application 20. System calls to the host application 20 are performed in the main UI thread 36 and most application code for the host application 20 is run in the main UI thread 36.

As shown in FIG. 4, the main UI thread 36 is accessed by the operating system 34 of the mobile device 12 during certain periods of time. For simplicity, the range of time during which the operating system 34 may access the main UI thread 36 is identified between T0 and TI 0 in FIG. 4.

In one approach, the tracking module 30 captures the visual interaction data by accessing the main UI thread 36 during these certain periods of time. However, doing so may adversely affect the availability of the main UI thread 36 to the operating system 34 during certain times. More specifically, in one embodiment, the operating system 34 and the tracking module 30 simultaneously maintain access to the main UI thread 36. However, such simultaneous access may cause burden to the main UI thread 36. Alternatively, the main UI thread 36 may allow access to either the operating system 34 or the tracking module 30, but not both. Nevertheless, in such instances, the operating system 34 may be deprived full access to the main UI thread 36. As such, poor performance of the operating system 34, and consequently, user interaction with the host application 20, may result during capture of the visual interaction data when the tracking module 20 is accessing the main UI thread 36.

In order to keep user interactions with the host application 20 fluid and uninterrupted, the tracking module 30 may additionally or alternatively capture interaction data by utilizing a second thread 37 that is independent of the main UI thread 36, as shown in FIG. 5. The second thread 37 may be provided by any suitable medium, including the host application 20, the tracking module 30, or the mobile device 12. By utilizing the second thread 37, much of the processing involved with capturing interaction data occurs off the main UI thread 36. As such, the adverse effects on the performance of the mobile device 12, operating system 34, and/or host application 20 are minimized.

In some instances, rendering UIView objects to a graphics context must be a "thread-safe" operation. Specifically, for multi-threaded programs, code is thread-safe if it manipulates shared data structures in a manner that guarantees safe execution by multiple threads at the same time. For certain operating systems 34, some views, e.g., UIWebView, do not guarantee thread safety. Therefore, steps must be taken to ensure thread safety. Otherwise, host application 20 instability can result.

In one embodiment, the tracking module 30 employs a swizzling technique for manipulating computer methods is utilized to ensure thread safety and minimize adverse affects on performance of the main UI thread 36 during capture of interaction data. The swizzling technique can override or intercept such source code by utilizing a dynamic runtime system, such as Objective-C runtime. The visual interaction data is captured as an object that represents the image on the screen. When a message is sent to the object, the dynamic runtime system finds a first implementation for a selector for a specific class and invokes the first implementation with a first functionality. The dynamic runtime system enables the tracking module 30 to override the first implementation with a supplemental implementation providing replacement functionality. However, the first implementation may still be invoked. As such, original methods in the source code may be "patched" with a supplemental method while still making use of the original method.

In one embodiment, the swizzling technique "intercepts" rendering calls to a method, such as renderInContext. If the operating system 34 attempts to render an unsafe layer, e.g. TileHostLayer, the operating system 34 copies all properties necessary for rendering, such as position, bounds, contents, and sublayers to a new layer and renders that layer instead. Intercepting rendering calls is not trivial. As stated above, the rendering operation traverses a layers' sublayers and renders those layers and their sublayers (and their sublayers, etc) in a recursive manner to the bitmap in the order in which they appear in the object hierarchy. The rendering method may be provided by an operating system software development kit (SDK) and often cannot be altered for purposes of implementing the swizzling technique. However, Objective-C is one of the programming languages supported by the operating system 34 runtime, e.g., iOS runtime. As such, Objective-C runtime is dynamic allowing the suspension of altering the rendering until runtime. In Objective-C, a method's selector and implementation are not bound at compile time but rather at runtime. When a message is sent to an object, the runtime system finds the implementation for a selector for a specific class (since selectors are not necessarily unique) and invokes that implementation. So, using the method_exchangeImplementations provided by the Objective-C runtime, the original renderInContext: implementation can be switched with a replacement that provides new functionality, while still allowing the original implementation to be invoked.

In one example, FIG. 5 illustrates by way of arrows between the second thread 37 and the main UI thread 36 how the swizzling technique is carried out. As shown, points at which arrows leave the second thread 37 are intended to represent moments at which the tracking module 30 initiates and reinitiates the swizzling technique. Points at which the arrows reach the main UI thread 36 are intended to represent moments at which the swizzling technique overrides the operating system 34 source code. Unlike FIG. 4, the operating system 34 substantially maintains full access to the main UI thread 36. FIG. 5 is intended a simplified representation of swizzling technique and is not intended to limit the swizzling technique. In other words, the swizzling technique may be illustrated according to various other representations without departing from its intended purpose.

Captured interaction data may be stored to the mobile device 12. As illustrated in FIG. 2, the mobile device 12 includes a mobile device storage 40, which is in communication with the host application 20 and/or tracking module 30. Captured interaction data may be stored into the mobile device storage 40. Both visual and non-visual captured interaction data may be stored in the mobile device storage 40. For instance, Bitmap files of images captured during operation of the host application 20 may be stored in the mobile device storage 40. Storage of captured interaction data in the mobile device storage 40 may be permanent or temporary. The mobile device storage 40 may be any conventional data storage device such as a hard disk or solid-state memory. The mobile device storage 40 is embedded generally within the mobile device 12. In other embodiments, captured interaction data may be stored in a buffer associated with the host application 20 and/or tracking module 30. Such a buffer may be implemented as any suitable buffer configuration known in the art.

The interaction data may be processed. Processing of the interaction data may occur after data is captured. Alternatively, processing of interaction data may occur while interaction data is captured. Processing of the captured interaction data is conducted generally in preparation for transmitting the captured interaction data to the tracking server 16, as will be discussed below. Specifically, captured interaction data, and more specifically captured visual interaction data, may consume large amounts of computer resources, such as memory. Therefore, transmission of captured interaction data from the mobile device 12 may be inefficient without processing. The captured interaction data is generally processed on the mobile device 12 itself.

Processing the captured interaction data may be further defined as encoding the captured visual interaction data. As shown at step 74 in FIG. 3, the captured visual interaction data is encoded. The captured visual interaction data is encoded for enabling efficient transmission of the captured interaction data from the mobile device 12 to the tracking server 16. As shown in FIG. 2, the mobile device 12 includes an encoder 44 in communication with the host application 20, tracking module 30, and/or mobile device storage 40.

The tracking module 30 captures visual interaction data and provides the captured visual interaction data to the encoder 44. The encoder 44 may be separated from the tracking module 30, as shown in FIG. 2. Alternatively, the encoder 44 is integrated with the tracking module 30. In such instances, the tracking module 30 encodes the captured visual interaction data. The tracking module 30 may be further defined as a movie-encoding API.

There are different techniques to encode and store the session visuals in the buffer for later transmission to the tracking server 16. The selection of these techniques can depend on many factors. Generally, complete bitmaps are not stored for every moment of interaction in a session because doing so would consume too many bytes of memory and consequently making transmission of these large payloads to the server difficult. Instead, visual changes are reduced, summarized, and compressed using a variety of techniques so that it can be reconstituted later for eventual replay of the session.

In one embodiment, the tracking module 30 is configured to measure how long it takes to capture visual interaction data. Based on the measurement, the tracking module 30 may dynamically increase or decrease frequency at which visual interaction data is captured. In doing so, the tracking module 30 maximizes performance of the host application 20, and ultimately the user's 22 experience with the host application 20.

In another embodiment, the step of encoding the captured visual interaction data is further defined as compressing the captured visual interaction data into a video. In this embodiment, the encoder 44 compresses images into the video using a codec. The video may be any suitable format, such as MPEG, MP4, AVI, WMV formats. Alternatively, the video may be an animated reproduction. The encoder 44 may utilize any suitable compression algorithm or program, such as a codec, for compressing the captured visual interaction data. The captured visual interaction data may be continuously compressed into the video in "real-time." In such instances, compression generally occurs simultaneously as the user 22 interacts with the host application 20 or immediately after the visual interaction data is captured on the mobile device 12. In other words, compression occurs piecemeal or intermittently. Alternatively, visual interaction data may be compressed at one time once requisite visual interaction data is captured. In such instances, all of the captured visual interaction data is provided to the encoder 44 at once.

In addition to visual interaction data, non-visual interaction data may be included in the video. For example, timing events associated with interaction data may be stored and inserted into corresponding frames of the video. The video may be stored in the mobile device storage 40 or buffer. As will be described below, the video may be retrieved and transmitted from the mobile device 12 to the tracking server 16.

On certain operating systems 34, such as iOS, once the tracking module 30 captures the screen to a UIImage, the tracking module 30 may use frameworks, such as AVFoundation and CoreVideo, which are provided by the operating system 34 to create a movie in real-time. When the tracking module 30 captures a screenshot, the time interval since the beginning of the session is noted and the frame is inserted into the movie at the correct time. When dealing with images on iOS, care must be taken to ensure the pixel information is consistent and predictable. For example, when creating the movie, the tracking module 30 can optionally specify 32-bit pixels format, such as BGRA8888. By doing so, the tracking module 30 ensures that it defines that bitmap with the same pixel format when the tracking module 30 captures the screen to a bitmap context.

In yet another embodiment, the step of encoding the captured visual interaction data is further defined as applying an image differencing process. The image differencing process compares captured visual interaction data. The image differencing process may be implemented by any suitable component(s) and/or process implemented with the mobile device 12. In one embodiment, the image differencing process is implemented by the tracking module 30.

In some cases, the image differencing process is better suited for a particular device for compressing the visual information into the buffer. This image differencing process can be summarized as image differencing or "diffing." In one embodiment, the result of the image differencing process is a collection of smaller images representing only the portions of the screen captures that have changed (the "diffs") and all the accompanying metadata that would be required to recreate the full image at any given point in time.

Figure 6:
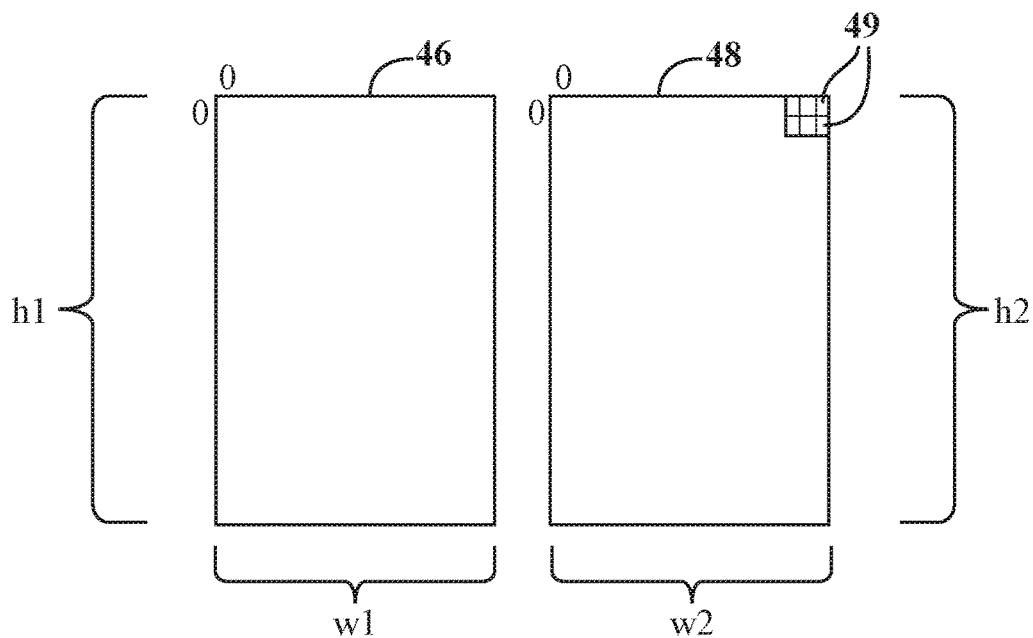
FIGS. 6-8 are computer process views of a method of encoding visual interaction data, according to one embodiment of the present invention.

As shown in FIG. 6, the image differencing process operates by assigning a coordinate space to a first image 46 and a second image 48 such that a coordinate origin of both images is 0,0. The image differencing process then compares the first and second images 46, 48 for differences. More specifically, the first and second images 46, 48 are formed of a plurality of pixels 49 and the image differencing process compares the first and second images 46, 48, one pixel 49 at a time. In some embodiments, for performance considerations, a heuristic can be applied to compare a subset of pixels 49 by omitting some pixels 49 during the comparison phase.

The first and second images 46, 48 generally have the same characteristics, such as dimension or area, for enabling efficient comparison. For example, in FIG. 6, the first image 46 defines a height h1 and a width w1 and the second image defines a height h2 and a width w2, whereby h1=h2, and w1=w2.

Figure 7:
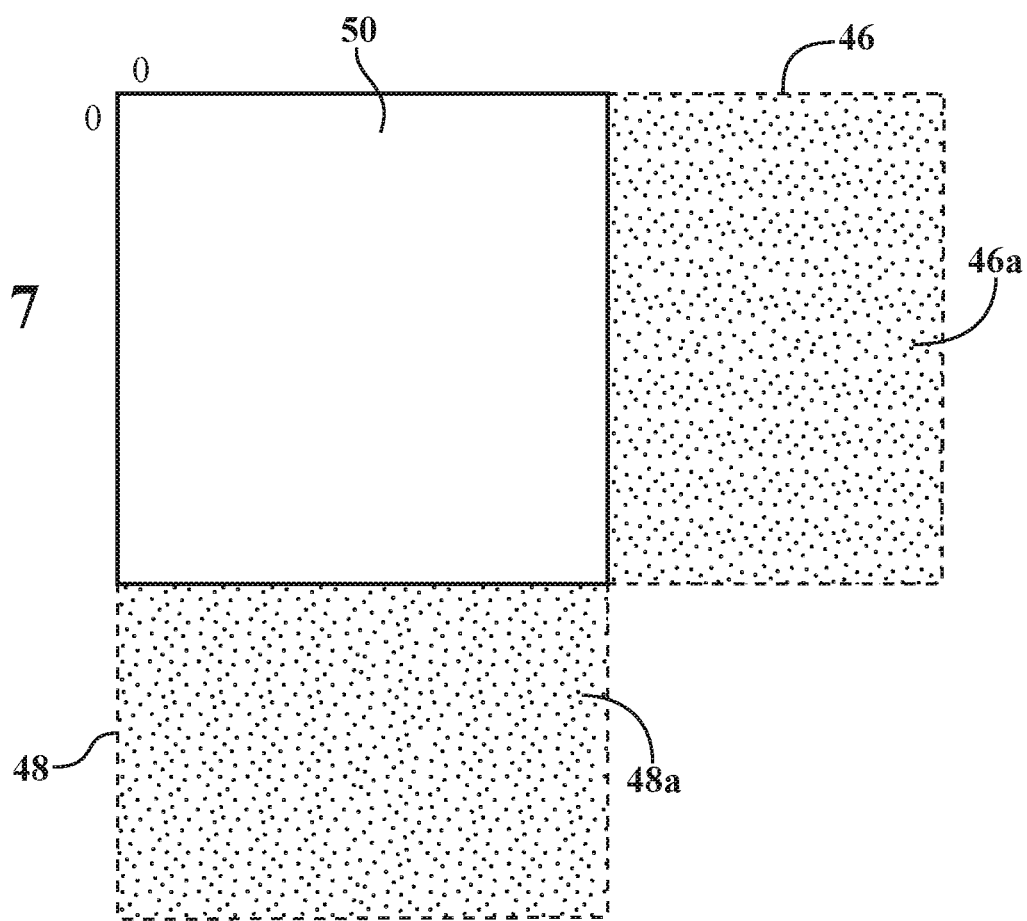

However, in some cases, as shown in FIG. 7, the first and second images 46, 48 may have different dimensions. The first image 46 may have an area 46a that does not overlap with the second image 48. Similarly, the second image 48 may have an area 48a that does not overlap with the first image 46. At this stage, the image differencing technique may recognize the areas 46a and 48a as differences between the first and second images 46, 48. The image differencing technique may do so for optimizing the process by eliminating a need for further analysis of areas 46a and 46b. FIG. 7 is provided merely for illustrative purposes and the term "overlap" is not intended to require that the first and second images 46, 48 be physically overlapping.

Figure 8:
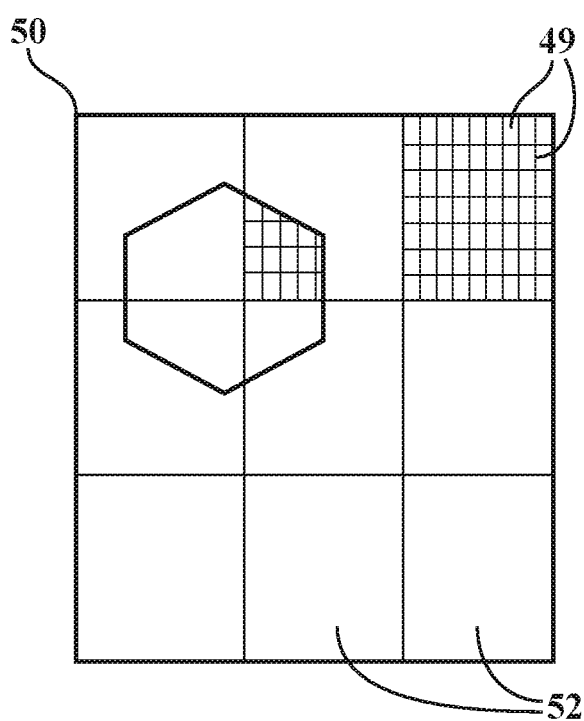

The common area of overlap between the first and second images 46, 48 is defined as a focus area 50, as shown in FIGS. 7 and 8. The focus area 50 may have various dimensions depending upon the size of the common area of overlap. The image differencing technique divides the focus area 50 into regions 52 that are smaller than the focus area 50. The regions 52 dividing the focus area 50 generally have a common size. The regions 52 may have any suitable size and the size of the regions 52 may depend upon various factors including, but not limited to, screen size and screen resolution. In one example, the dimensions of the focus area 50 are 300×300 pixels and the focus area 50 is divided into regions 52 of 50×50 pixels.

Each region 52 may include any suitable number of pixels 49. For example, each region 52 may include between 10 and 100 pixels. The pixels 49 may be further defined as square pixels 49. In FIG. 8, the pixels 49 may not be drawn to scale and are represented for only one of the regions 52 for simplicity in illustration. If the size of the regions 52 is too small, performance of the component(s) and/or processes implementing the image differencing process may be adversely impacted. Yet, if the size of the regions 52 is small, the image differencing process may more accurately detect differences between the first and second images 46, 48.

Each region dividing the focus area 50 is examined pixel-by-pixel 49. Each pixel 49 includes a red, green, and blue color component. Each of the color components of each pixel 49 has an intensity level. In one embodiment, the image differencing process compares the intensity levels for each of the color components of each pixel 49 in a specified region 52 of the focus area 50. Specifically, the image differencing process detects differences in the intensity levels of color components between a pixel 49 in the first image 46 and color components of a corresponding and overlapping pixel 49 in the second image 48. In one example, the image differencing process detects differences by subtracting the intensity levels of each of the color components of the pixel 49 in first image 46 from the corresponding intensity levels of each of the color components of the pixel 49 in the second image 48 to determine a difference in intensity level for each color component. Thereafter, the difference in intensity levels for each of the color components is divided by a total possible number of colors available for the specific color component. In one example, the total possible number of colors available for each color component is 256. The image differencing process then establishes a difference value, such as a percentage value, representing the difference in intensity level.

The image differencing process continues to examine each of the pixels 49 in the specified region 52 according to this method. In one embodiment, the image differencing process establishes a total difference in the intensity level for the specified region 52 as a whole based on all of the pixels 49 in the specified region 52. The image differencing process may establish the total difference in intensity level by combining the calculated difference values for the pixels in the specified region 52. However, the total difference in intensity level may be established according to other methods.

The image differencing process determines whether the total difference in the intensity level is greater than a predefined threshold percentage difference. In one embodiment, the predefined threshold percentage difference is defined as at least a 2% difference. If the total difference in the intensity level is greater than the predefined threshold percentage difference, the specified region 52 is recognized as having a notable image difference between the first and second images 46, 48. In such instances, imaging data, such as bitmap data, for the specified region 52 is saved to the mobile device storage 40. In one embodiment, the imaging differencing process stops analyzing the pixels 49 in the specified region 52 once the predefined threshold percentage difference is reached. The imaging differencing process may do so to reduce the number of pixels 49 being analyzed thereby maximizing performance of the imaging differencing process. Thereafter, the imaging differencing process continues to a subsequent region 52 in the focus area 50 to examine the subsequent region 52. The subsequent region 52 may be adjacent to the previously analyzed region 52. The imaging differencing process continues analyzing the regions 52 in such a fashion until each of the regions 52 in the focus area 50 is analyzed.

Each region 52 recognized as not having a notable image difference is discarded or unused. Each region 52 recognized as having a notable image difference is cropped out of the focus area 50 and saved as a difference image in the mobile device storage 40. On the Android operating system, for example, this may be performed in Java. For better performance, however, a native implementation using a JNI bridge could be employed. On iOS, this may be implemented in Objective-C but could also be implemented in C for better performance. These optimizations are sometimes referred to as writing the algorithm in "native" code.

The difference images are significantly smaller than the first and second images 46, 48 and allow efficient transmission of the visual interaction data to the tracking server 16, as will be described below.

In some instances, a first difference image and a second difference image may include common imaging data such that the first and second difference images overlap. In such instances, the first and second difference images may be combined. In other instances, difference images that were derived from adjacent regions 52 in the focus area 50 may be combined. In either instance, combining difference images may be done in order to minimize info nation that is stored in the mobile device storage 40.

The imaging differencing process may compare and analyze the pixels 49 of the specified region 52 according to other methods not specifically recited herein without departing from the scope of the invention. Furthermore, the imaging differencing process may be implemented according to any suitable programming language or framework, such as Java, Java Native Interface (JNI), C, or Objective C.

In one embodiment, the tracking module 30 itself implements the image differencing process. In another embodiment, the tracking module 30 may enlist a service process for implementing the image differencing process. In one embodiment, the service process is called from within the host application 20. In most cases, the tracking module 30 and/or service process implement the image differencing process on a separate thread from the main UI thread 36. In other words, the captured images are compared for differences on the separate thread as opposed to the main UI thread 36. By doing so, overuse of the main UI thread 36 is prevented and responsiveness of the mobile device 12, operating system 34, and host application 20 are maximized.

One example of the service process for implementing the differencing process is IntentService by Android®. The service process generally receives a request to add a task. The task is added to a queue and the service process operates in the background to complete the task. For example, a request may be sent to the service process once the first and second images 46, 48 are captured and/or stored. The request may include identifying information associated with the first and second images 46, 48. The service process may then implement the imaging differencing process. The service process will then apply the image differencing process to produce a set of smaller images as well as the necessary metadata. The metadata may contain information relating to where (i.e. coordinate information) and when (i.e. timestamp) the set of diffs should be applied. The service process may implement the image differencing process according to other techniques not specifically recited herein.

The captured non-visual interaction data may be synchronized with corresponding difference images resulting from the image differencing process. In one embodiment, the service process associates meta-data with each difference image resulting from the imaging differencing process. Such meta-data may include information such as coordinate information and timestamp information associated with each difference image.

Another step in the process of recording the visual interaction information may be masking, or redacting, portions of the image before it is transmitted to the tracking server 16. One reason for doing so is to prevent personally identifiable, or private, information (e.g. user names, passwords, credit card numbers) from being included in the visual interaction data that is transmitted to the tracking server 16. Screen captures containing such personal information need to be "masked" so that such information is no longer visible when the session is eventually watched. In addition, masking ensures that such information is not transmitted over networks and stored permanently anywhere.

There is a variety of ways of achieving masking. On the iOS platform, to mask an arbitrary view or control in an application, the tracking module 30 can use the swizzling technique described earlier. In the "intercepted render" method, if the tracking module 30 is rendering the backing layer for a view that has been registered as needing masking, the tracking module 30 instead draws a black box with the same position and bounds as the original view. The visual elements chosen for masking can be configured at compile-time by passing references to those elements to the tracking module 30, or by defining XPATH's to those elements.

Alternatively, masking can be performed by "walking" the view hierarchy (starting from the root view) and inspecting each of the nodes in the view tree. If a subview (for example, a text box, or label) is encountered and is marked for masking, a mask is drawn on the screen capture at the coordinates of the subview.

If the text field being edited has been identified as needing to be redacted or masked, it is important to also obscure any onscreen keyboard graphics that appear. On some devices, particularly on iOS, an on-screen keyboard appears. What is being typed can be inferred by observing the keys that are pressed on the onscreen keyboard. Consequently, onscreen keyboard graphics must be obscured from the collected image data in the buffer. When drawing the keyboard to the captured bitmaps, the tracking module 30 can check if the currently editing view is masked/secure (in the same swizzled renderInContext: method) and if so, draw a placeholder with the same dimensions as the keyboard on top of the position on the screen where the keyboard would appear. The tracking module 30 may mask personally identifiable regions according to other methods not specifically described herein.

The process of capturing and processing visual interaction data can be fairly resource intensive and may not be supported on all mobile devices 12. In order to avoid adversely affecting the user experience, the tracking module 30 may capture data regarding the ability of the mobile device 12 to perform the necessary processing. Such data can be analyzed to determine whether the parameters for session capture, for example, the capture rate, should be adjusted. For mobile devices 12 failing to meet a certain threshold of capability, session capture can be disabled. Some of the data that can be captured and examined includes, but is not limited to, maximum available heap size, "memory class", execution time for diffing and cropping tasks.

Other techniques can be used to minimize the CPU overhead during capture and processing. For example, images can be downsampled (shrunk down) so that both payload size and processing overhead are minimized. The frequency of image capture and the rate at which images are processed can be altered to avoid interfering with user experience and to maximize battery life of the device. Alteration of the frequency of image capture can apply for the image differencing technique and/or movie encoding.

Additionally, dynamic performance monitoring can be instrumental in adjusting the use of these techniques for optimal performance. By measuring the time consumed by image capture and/or processing the frequencies of work and the degree to which optimization techniques are utilized can be automatically increased or decreased.

At step 76, the captured interaction data, including visual and/or non-visual interaction data, is transmitted from the mobile device 12 to the tracking server 16. In one embodiment, the tracking module 30 initiates transmission of the captured interaction data. The mobile device 12 includes standard computing components to facilitate transmission of the captured interaction data to the tracking server 16. As mentioned above, once the captured interaction data is processed according to any of the aforementioned methods, the processed interaction data may be stored in the mobile device storage 40 or the buffer.

Before transmission, the captured interaction data may be retrieved from the mobile device storage 40 or buffer. In one embodiment, the tracking module 30 retrieves the stored interaction data. Transmission of captured interaction data may be further defined as transmission of the buffer including the captured interaction data. In one embodiment, transmission to the tracking server 16 occurs periodically or intermittently. However, transmission may occur at one time.

Transmission of captured interaction data may occur with knowledge of the user 22 through the presentation of a process dialog. In such instances, the captured interaction data in the buffer can be transmitted in a foreground thread. Alternatively, transmission of captured interaction data may occur in background processes without knowledge of the user 22.

The captured interaction data may have any suitable format before or during transmission. Because transmission possibly may be long running and asynchronous, on iOS it can be advantageous to initiate a long-running background task to prevent the OS from suspending those operations using the UIApplication beginBackgroundTaskWithExpirationHandler: method.

In one embodiment, captured interaction data is transmitted to the tracking server 16 only upon the occurrence of a predetermined event. The predetermined event may be defined as the user 22 having experienced a particular feature. In one example, the user 22 may be invited from the host application 20 to complete a survey. Once the user 22 accepts the invitation and completes the survey, the predetermined event is deemed to have occurred and the captured interaction data may be transmitted. The predetermined event may also be defined as the user 22 using the host application 20 for a predefined threshold of time, such as a minimum threshold of time. The predetermined event may be defined as the detection of a specified type of internet connection, such as Wi-Fi. In such embodiments, detection of Wi-Fi before transmission may be important to reduce cellular carrier data usage by the mobile device 12. If the specified type of internet connection is not available, the captured interaction data may be stored in the mobile device storage 40 until such connection becomes available. The predetermined event may also be the detection of any mobile device 12 command or status. In one example, transmission occurs only when the mobile device 12 is idle.

For performance and efficiency, the captured visual interaction data in the buffer can be transmitted as a collection of images and accompanying metadata in a compressed format (e.g. zip file format). The captured non-visual interaction data in the buffer can be transmitted as text in a JSON format. There are alternate formats and configurations to transmit the buffer, however.

At step 78, the captured interaction data is received on the tracking server 16. The tracking server 16 includes standard computing components known in the art for receiving captured interaction data from the mobile device 12 and sending captured interaction data to the analysis computer 18. The step of receiving captured interaction data may be further defined as receiving the buffer including the captured interaction data.

As shown in FIG. 1, the tracking server 16 is connected to a tracking storage 54. The tracking storage 54 may include a conventional data storage device, such as a hard disk or solid-state memory. The tracking storage 54 may be located within and connected directly to tracking server 16. Alternatively, the tracking storage 54 may be a remote data storage facility connected to tracking server 16, such as a database. In either instance, the received interaction data is generally provided to the tracking storage 54 in preparation for further processing, as will be described below.

When the captured interaction data in the buffer has been completely received by the tracking server 16, or when enough interaction data has been received such that there is enough interaction data to reconstitute a contiguous portion of a session, some processing needs to occur to convert it into a format that can be replayed.

At step 80, the captured interaction data received on the tracking server 16 is converted into a visual representation. In one embodiment, the visual representation is a representation of the user's 22 interaction with the host application 20. The visual representation may be defined as a video file. The video file may have any video format known in the art, such as AVI, WMV, or MP4. The visual representation may additionally include audio relating to the host application 20.

The system 10 may include a processing module 56 for converting the received interaction data into the visual representation. The processing module 56 is in communication with the tracking server 16. In one embodiment, as shown in FIG. 1, the processing module 56 is separate from the tracking server 16. In another embodiment, the processing module 56 is integrated with the tracking server 16. The processing module 56 may retrieve the interaction data from the tracking storage 54.

In other embodiments, processing of the interaction data for replay may occur on the mobile device 12 before transmission to the tracking server 16. Thus, it is not necessary that processing of the interaction data for replay occur on a tracking server 16. However, doing so on the tracking server 16 is advantageous to offload this work to a remote machine to maximize performance on the mobile device 12.

The interaction data may be converted once all the interaction data relating to the host application 20 is received at the tracking server 16. Alternatively, interaction data may be converted once a predefined requisite amount of the interaction data is received at the tracking server 16. The step 80 of converting the interaction data may be further defined as converting the buffer including the interaction data.

The following approaches may be taken in instances where it is desired to encode a self-contained video file, such as MPEG, WMV, AVI, FLV, etc. In some instances, the interaction data may be provided in a video file before the interaction data is received at the tracking server 16. If the container format for the raw images in the buffer is already a video file such as MPEG, WMV, AVI, FLV, etc., then the processing module 56 can take one of many approaches. One approach is to extract images at regular time intervals from the video file using a third-party API, such as FFMPEG or Microsoft Expression Encoder, and overlay touch symbols at the appropriate places in the video. In such instances, the processing module 56 may extract images at regular time intervals from the video file using an additional API or encoder. The processing module 56 may then overlay touch symbols (such as round symbols or fingerprint symbols) at appropriate places in the video and re-code the video using the additional API to create the visual representation.

In instances where captured visual interaction data includes difference images resulting from the image differencing process, the visual representation is created according to another method. The difference images are reapplied to a canvas. In the processing stage, the raw images are applied to the canvas that is the size of the original screen in the positions and sizes they were taken from originally. Time indexes associated with the difference images may be analyzed and referenced. Any additional information such as touch indicators are overlaid on the canvas and a processed image is finalized. The processed images are encoded in frames of the video using any suitable encoding API to create the visual representation. The visual representation may be stored in the tracking storage 54. The interaction data may be converted into the visual representation using other methods not specifically recited herein.

The following approaches may be taken in instances where it is desired to encode an animated format, such as Flash or another custom animated format. Generally, features of the third-party API's are used to overlay animations onto the existing movie, by video encoding. Animations may be overlaid on to the video file by video encoding to create the visual representation. An animation format such as Flash or other custom format may be utilized wherein the replay is achieved by overlaying raw images and animating elements, such as touches, on top of the raw images.

In the case where the source container format for the image data is a video file such as MPEG, WMV, AVI, FLV, etc, then the processing module 56 may extract images from the video using third party API's, such as FFMPEG or Microsoft Expression Encoder. Frames of video as bitmaps are extracted from the video at regular intervals, and the differencing algorithm is performed on those images. The diff's are extracted from the bitmaps and those bitmaps are added to an event timeline. The event timeline can then be replayed in a custom player, such as a Flash player, Silverlight player, HTML5 based player, or similar.

In the case where the source container format is diff's, then the diffs can be directly transcoded into the final replayable format for animation using their positions and time indices.

In either case, information such as touch events, orientation, and device information must be included in the final animation format at their time indices so that this information can be represented in the final playback.

Once the visual representation is created, the analysis computer 18 requests the visual representation from the tracking server 16, as shown at step 82. Generally, an end-user (not shown) interacts with the analysis computer 18 to request the visual representation. However, the visual representation may be requested independent of the end-user. The visual representation may be also retrieved from the tracking storage 54. The visual representation may be requested and stored on the analysis computer 18 according to any suitable method. In one example, the visual representation is downloaded from the tracking server 16 and saved to memory in the analysis computer 18 for later viewing.

At step 84, the requested visual representation may be presented on the analysis computer 18. The analysis computer 18 typically includes a display 58 for enabling the visual representation to be presented on the analysis computer 18. The visual representation is generally presented to the end-user through the display 58 of the analysis computer 18. The end-user may examine the presented visual representation to gather information regarding the captured interaction data. The visual interaction is generally presented independent of the tracking server 16. Furthermore, the visual representation may be presented on the analysis computer 18 according to any suitable method. In one example, the visual representation is presented through a web browser.

One of the many advantages of the system 10 is to record enough visual and contextual data from the user's 20 session inside the host application 20 to recreate at a later time a replay of the user's 20 session for the purposes of usability analysis. Such replays can be coupled with survey responses to provide a full understanding of how a user 20 is using the host application 20, what issues a user 20 may be having with the host application 20, and/or where there are opportunities for improving user satisfaction and overall usability.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method comprising the steps of:
   embedding a tracking module in a host application, the host application having been downloaded and installed on a mobile device and operable independent from a web browser, the mobile device including an operating system that accesses a main user interface (UI) thread, wherein the tracking module comprises an application programming interface (API);
   capturing with the tracking module visual interaction data relating to the host application wherein the visual interaction data includes images presented on a display of the mobile device and wherein the tracking module captures the visual interaction data by:
      accessing the main user UI thread shared by the operating system;
      acquiring layers of an object from a user interface of the host application;
      rendering layers of the object; and
      intermittently accessing a second thread during capture of the visual interaction data, the second thread independent of the main UI thread, thereby increasing availability of the main UI thread for the operating system during capture of the visual interaction data;
   and
   transmitting the visual interaction data from the mobile device to a tracking server.

2. The computer-implemented method of claim 1 further including the tracking module:
   measuring a period of time required to capture the visual interaction data; and
   dynamically altering a frequency at which the visual interaction data is captured based on the measured period of time required to the capture interaction data.

3. The computer-implemented method of claim 1 further including the tracking module:
   capturing data representing the availability of resources of the mobile device; and
   dynamically altering a frequency at which the visual interaction data is captured based on the visual data representing the availability of resources of the mobile device.

4. The computer-implemented method of claim 1 further including: storing the visual interaction data to a buffer; and
   retrieving, with the tracking module, the visual interaction data from the buffer.

5. The computer-implemented method of claim 1 further including the tracking module compressing the visual interaction data in preparation for transmission.

6. The computer-implemented method of claim 5 wherein compressing further includes the tracking module applying an image differencing process to capture visual differences between sequential interaction data.

7. The computer-implemented method of claim 1 wherein transmitting the visual interaction data includes transmitting the visual interaction data upon occurrence of a predetermined event including at least one of detection of a predetermined network connection for the mobile device, a detection of a command or status of the mobile device, an acceptance of an invitation to complete a survey, and a completion of a survey.

8. The computer-implemented method of claim 1 further including masking, with the tracking module, portions of the visual interaction data before transmission.

9. The computer-implemented method of claim 1, further comprising capturing, with the tracking module, non-visual interaction data relating to the host application, the non-visual interaction data comprises meta-data including at least one of touch-event data, gesture data, GPS coordinate data, audio data, accelerometer data, orientation data, camera data, barometer data, and compass data.

10. The computer-implemented method of claim 1 wherein capturing the images includes capturing a change to the images wherein the change is initiated by a user.

11. The computer-implemented method of claim 1 wherein capturing the images includes capturing a change to the images wherein the change is initiated by the host application independent of a user.

12. A non-transitory computer-readable medium comprising instructions, which when executed by one or more processors, implement a tracking module, the tracking module configured to be embedded in a host application, the host application having been downloaded and installed on a mobile device and operable independent from a web browser, the mobile device including an operating system that accesses a main user interface (UI) thread, the tracking module comprising an application programming interface (API) and being configured to:
   capture visual interaction data relating to the host application wherein the visual interaction data includes images presented on a display of the mobile device, and to capture the visual interaction data, the tracking module is configured to:
      access the main user UI thread shared by the operating system;
      acquire layers of an object from a user interface of the host application; render layers of the object; and
      intermittently access a second thread during capture of the visual interaction data, the second thread that is independent of the main UI thread;
   and
   transmit the visual interaction data from the mobile device to a tracking server.

13. The non-transitory computer-readable medium of claim 12, wherein the tracking module is further configured to:
   measure a period of time required to capture the visual interaction data; and
   dynamically alter a frequency at which the visual interaction data is captured based on the measured period of time required to the capture interaction data.

14. The non-transitory computer-readable medium of claim 12, wherein the tracking module is further configured to:
   capture data representing the availability of resources of the mobile device; and
   dynamically alter a frequency at which the visual interaction data is captured based on the visual data representing the availability of resources of the mobile device.

15. The non-transitory computer-readable medium of claim 12, wherein the tracking module is further configured to:
   store the visual interaction data to a buffer; and
   retrieve, with the tracking module, the visual interaction data from the buffer.

16. The non-transitory computer-readable medium of claim 12, wherein the tracking module is configured to compress the visual interaction data in preparation for transmission.

17. The non-transitory computer-readable medium of claim 16, wherein the tracking module is configured to compress the visual interaction data by applying an image differencing process to capture visual differences between sequential interaction data.

18. The non-transitory computer-readable medium of claim 12, wherein the tracking module is further configured to transmit the visual interaction data upon occurrence of a predetermined event including at least one of detection of a predetermined network connection for the mobile device, a detection of a command or status of the mobile device, an acceptance of an invitation to complete a survey, and a completion of a survey.

19. The non-transitory computer-readable medium of claim 12, wherein the tracking module is further configured to mask portions of the visual interaction data before transmission.

20. The non-transitory computer-readable medium of claim 12, wherein the tracking module is further configured to capture non-visual interaction data relating to the host application, the non-visual interaction data comprises meta-data including at least one of touch-event data, gesture data, GPS coordinate data, audio data, accelerometer data, orientation data, camera data, barometer data, and compass data.

* * * * *